United States Patent
Maki et al.

(10) Patent No.: US 9,803,769 B2
(45) Date of Patent: Oct. 31, 2017

(54) SOLENOID FIXING STRUCTURE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tomohide Maki, Mie (JP); Hiroyoshi Maesoba, Mie (JP); Kosuke Sone, Mie (JP); Katsushi Miyazaki, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/113,934

(22) PCT Filed: Jan. 27, 2015

(86) PCT No.: PCT/JP2015/052122
§ 371 (c)(1),
(2) Date: Jul. 25, 2016

(87) PCT Pub. No.: WO2015/122267
PCT Pub. Date: Aug. 20, 2015

(65) Prior Publication Data
US 2016/0341327 A1 Nov. 24, 2016

(30) Foreign Application Priority Data
Feb. 17, 2014 (JP) .................................. 2014-027690

(51) Int. Cl.
*F16K 27/12* (2006.01)
*F16K 31/06* (2006.01)
(Continued)

(52) U.S. Cl.
CPC ............ *F16K 27/12* (2013.01); *F16K 27/003* (2013.01); *F16K 27/029* (2013.01); *F16K 31/06* (2013.01)

(58) Field of Classification Search
CPC ........ F16K 27/12; F16K 31/06; F16K 27/029; F16K 27/003
(Continued)

(56) References Cited

U.S. PATENT DOCUMENTS

| | | | | |
|---|---|---|---|---|
| 6,170,516 B1 * | 1/2001 | Sakata et al. | ...... | F02M 25/0836 137/343 |
| 6,539,971 B2 * | 4/2003 | Moreno et al. | ....... | F16K 27/003 137/15.18 |
| 7,089,663 B2 * | 8/2006 | Arai et al. | ............. | B22D 17/00 264/242 |

FOREIGN PATENT DOCUMENTS

| | | |
|---|---|---|
| JP | 58-38080 | 3/1983 |
| JP | 2003-49802 | 2/2003 |

(Continued)

OTHER PUBLICATIONS

International Search Report., PCT/JP2015/053122, Apr. 2015.

*Primary Examiner* — Kevin Lee
(74) *Attorney, Agent, or Firm* — Gerald E. Hespos; Michael J. Porco; Matthew T. Hespos

(57) ABSTRACT

A fixing structure for solenoid (10) includes a valve body (50) including a tubular valve insertion portion (51), a solenoid (10) to be inserted into the valve insertion portion (51), a cover (60) to cover the valve body (50) in a direction intersecting an inserting direction of the solenoid (10) into the valve insertion portion (51), and a pin (40) to be inserted
(Continued)

and pierced through the valve insertion portion (51) and the solenoid (10) from the side of the cover (60), thereby restricting detachment of the solenoid (10) from the valve insertion portion (51). The cover (60) includes a resilient pressing piece (61) to be pressed against the pin (40) and resiliently deformed when inserting the pin (40) and to hold an inserted state of the pin (40) by resiliently returning and pressing an end of the pin (40) when the insertion of the pin (40) is completed.

10 Claims, 4 Drawing Sheets

(51) Int. Cl.
*F16K 27/02* (2006.01)
*F16K 27/00* (2006.01)

(58) Field of Classification Search
USPC .................................................. 137/315.03
See application file for complete search history.

(56) References Cited

FOREIGN PATENT DOCUMENTS

| JP | 2007-187292 | 7/2007 |
| JP | 2010-12906 | 1/2010 |
| JP | 2010-54016 | 3/2010 |

* cited by examiner

SOLENOID FIXING STRUCTURE

BACKGROUND

1. Field of the Invention

The present invention relates to a solenoid fixing structure.

2. Description of the Related Art

Japanese Unexamined Patent Publication No. 2010-12906 discloses a solenoid fixing structure provided with a body including a recess into which a solenoid is to be inserted, a fixing plate for restricting a movement of the solenoid inserted into the recess, a screw for fixing the fixing plate to the body and a knob assembly (other component) arranged to cover the screw.

In the above case, since the fixing plate, the screw and the knob assembly are necessary in fixing the solenoid to the body, there are problems that the number of components is large and an assembling workload is large. As a measure against this, if a method for directly fixing the solenoid with the screw is adopted, the number of components can be reduced. However, if the screw is screwed when the solenoid is in an incompletely inserted state without being inserted to a proper depth into the recess, there is a problem that the tip of the screw interferes with the outer peripheral surface of the solenoid to damage the solenoid. Further, in the above case, in removing the solenoid from the body, the screw has to be loosened after the knob assembly is removed from the body. Thus, it is not possible to singly remove only the solenoid.

The present invention was completed based on the above situation and aims to provide a solenoid fixing structure having a small number of components, facilitating the removal of a solenoid and enabling an operator to know whether or not the solenoid is properly fixed.

SUMMARY

The present invention is directed to a solenoid fixing structure with a valve body including a tubular valve insertion portion, a solenoid to be inserted into the valve insertion portion, a cover arranged to cover the valve body in a direction intersecting with an inserting direction of the solenoid into the valve insertion portion, and a pin to be inserted and pierced through the valve insertion portion and the solenoid from a side where the cover is located with the solenoid inserted in the valve insertion portion, thereby restricting the detachment of the solenoid from the valve insertion portion. The cover includes a resilient pressing piece configured to be pressed against the pin and resiliently deformed in the process of inserting the pin and hold an inserted state of the pin by resiliently returning and pressing an end part of the pin when the insertion of the pin is completed.

When the pin is inserted and pierced through the valve insertion portion and the solenoid from the side where the cover is located after the solenoid is inserted into the valve insertion portion, the resilient pressing piece provided on the cover is resiliently deformed in the process of the insertion and resiliently returns and presses the end part of the pin when the insertion is completed. Thus, the inserted state of the pin is held and the detachment of the solenoid from the valve insertion portion is restricted. Since the resilient pressing piece is provided on the cover and a dedicated member for fixing the solenoid is not necessary other than the pin, an increase in the number of components can be prevented. Further, the solenoid can be easily removed from the valve body by resiliently deforming the resilient pressing piece in a press releasing direction and, in that state, taking the solenoid out of the valve insertion portion. Furthermore, if the solenoid is in an incompletely inserted state without being inserted to a proper depth into the valve insertion portion, the insertion of the pi is restricted and the resilient pressing piece is left resiliently deformed by being pressed by the pin. Thus, it can be clearly known that the solenoid is in the incompletely inserted state.

The resilient pressing piece includes a resilient main body arranged along a length direction of the pin in a resiliently return state when the insertion of the pin is completed. The state of the resilient pressing piece pressing the pin is maintained stably by the resilient main body. Further, the pin is protected by the resilient main body.

The cover includes a wire arrangement groove in which a wire is to be arranged. The cover has both a function of arranging the wire and a function of pressing the pin via the resilient pressing piece. Thus, the number of components can be reduced as compared to the case where both functions are provided by different members.

The valve insertion portion includes a pin insertion hole, and the solenoid includes a pin insertion groove. The pin insertion hole and the pin insertion groove communicate to allow the insertion of the pin from the pin insertion hole to the pin insertion groove in a state where the solenoid is inserted to a proper depth in the valve insertion portion, whereas the pin insertion hole and the pin insertion groove are deviated without communicating to restrict the insertion of the pin from the pin insertion hole to the pin insertion groove in a state where the solenoid is not inserted to the proper depth in the valve insertion portion. In this way, whether or not the solenoid is inserted to the proper depth in the valve insertion portion can be easily detected based on whether or not the pin insertion hole and the pin insertion groove communicate.

An outward projecting amount of the pin from the pin insertion hole exceeds a normal value in the state where the solenoid is not inserted to the proper depth in the valve insertion portion. Accordingly, detection of whether the solenoid is inserted to the proper depth in the valve insertion portion can be confirmed by a visual or tactile determination of the projecting amount of the pin.

DETAILED DESCRIPTION

An embodiment of the present invention is described with reference to FIGS. 1 to 4. A fixing structure for a solenoid 10 according to the embodiment illustrated is provided in a hydraulic control device 90 of an automatic transmission of an automotive vehicle.

Figure 1:
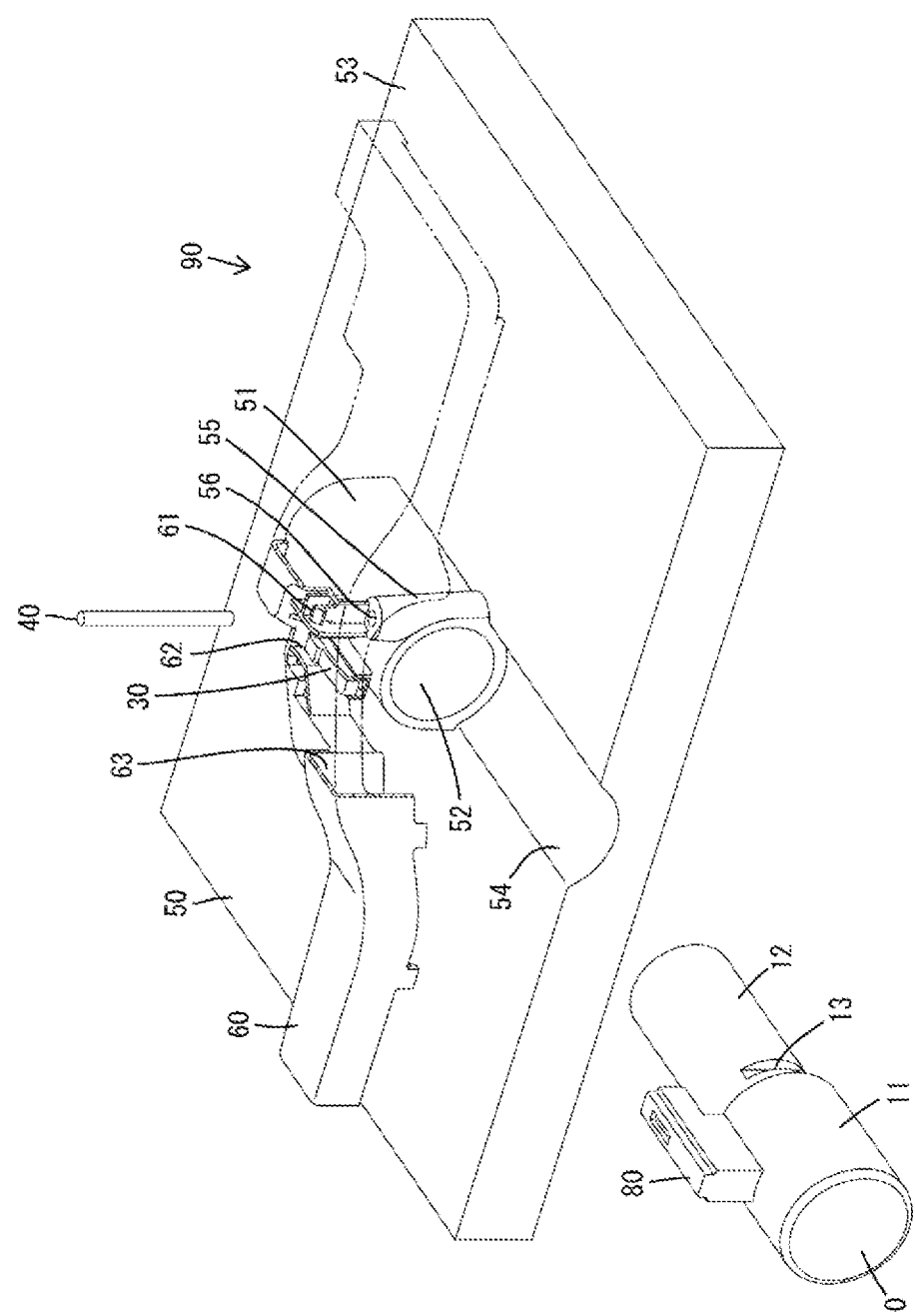
FIG. 1 is an exploded perspective view of a pin member, a solenoid and a valve insertion portion in a solenoid fixing structure according to an embodiment of the present invention.
Figure 2:
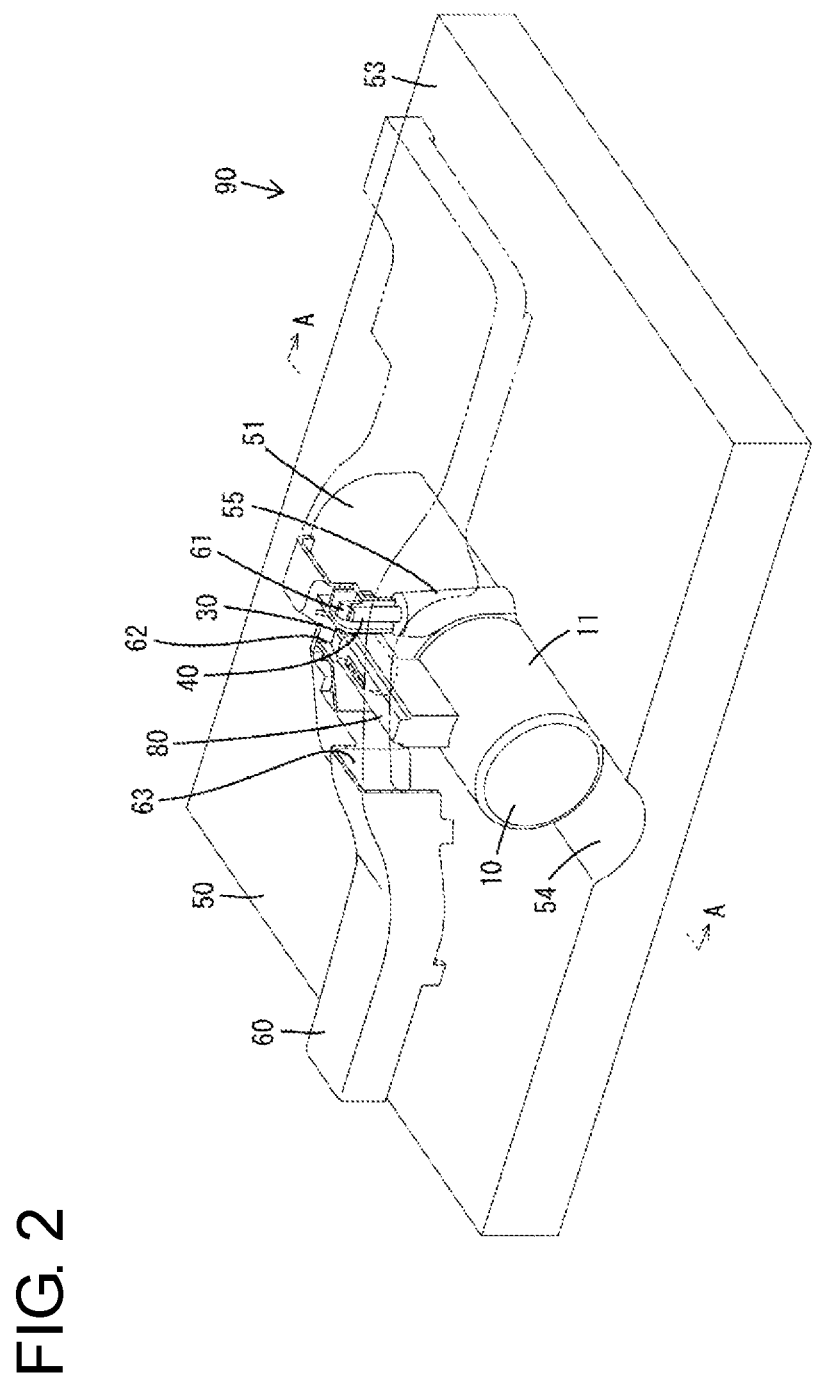
FIG. 2 is a perspective view showing a state where the solenoid is fixed to a valve body via the pin member and a resilient pressing piece.

As shown in FIGS. 1 and 2, although not shown in detail, the hydraulic control device 90 includes a cover 60 and a valve body 50 juxtaposed with the cover 60 in a height direction. The solenoid 10 is incorporated into the valve body 50 and fixed to the valve body 50 via a pin 40 and a resilient pressing piece 61 to be described later.

The valve body 50 is provided with a plurality of cylindrical valve insertion portions 51 (only one is shown in FIGS. 1 and 2). The valve insertion portion 51 is provided with a valve insertion hole 52 extending in a front-back direction and open on a front end. A lower end part of the valve insertion portion 51 is integrally connected to a bottom portion 53 of the valve body 50, the bottom portion 53 being in the form of a flat plate. A supporting groove 54 continuously extending in front of the valve insertion portion 51 is recessed on the upper surface of the bottom portion 53.

Figure 3:
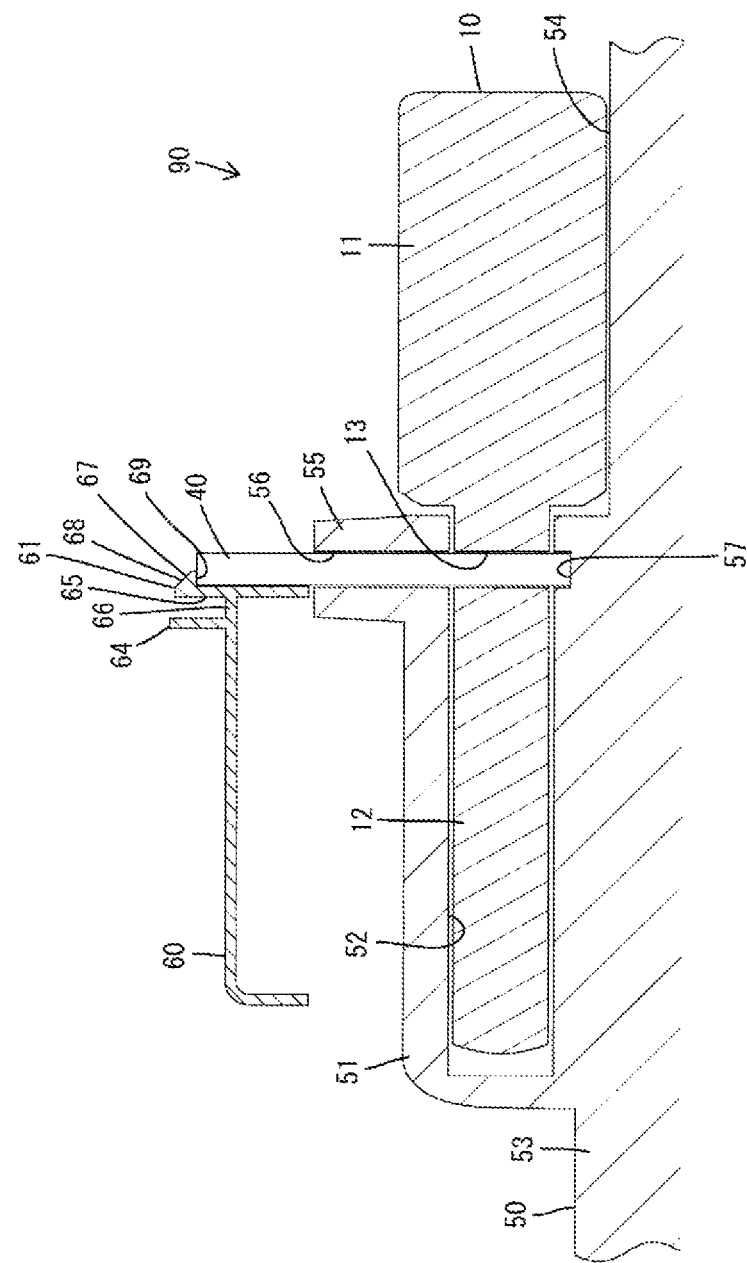
FIG. 3 is a section along A-A of FIG. 2.
Figure 4:
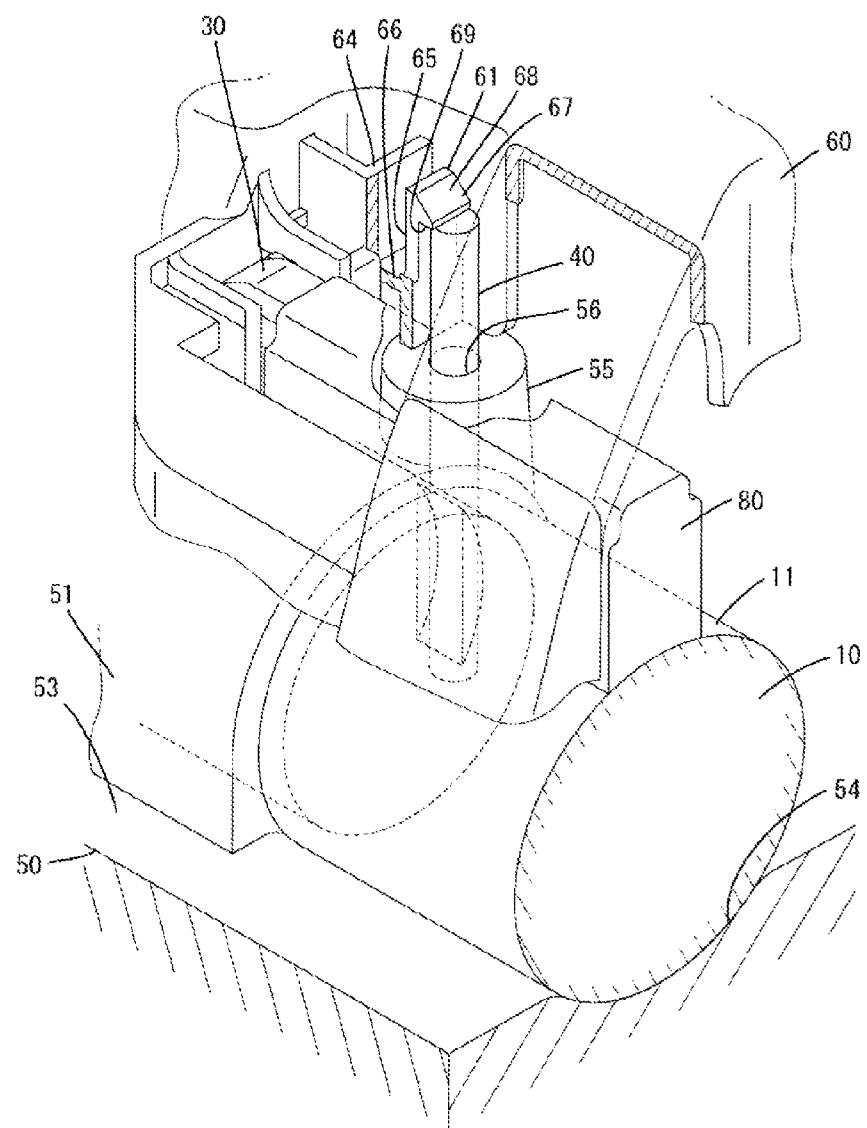
FIG. 4 is an enlarged perspective view of an essential part showing a state where the solenoid is fixed to the valve body via the pin member and the resilient pressing piece.

Further, a cylindrical pin insertion portion 55 intersecting with the valve insertion portion 51 and standing up is provided on the upper surface of the bottom portion 53. As shown in FIGS. 3 and 4, the pin insertion portion 55 is provided with a pin insertion hole 56 extending in a vertical direction and open on an upper end.

As shown in FIGS. 1 and 2, a vertical intermediate part of the pin insertion portion 55 between lower and upper ends is integrally coupled to a radial end part of a front end side of the valve insertion portion 51. As shown in FIG. 3, a lower part of the pin insertion hole 56 communicates substantially at a right angle with the valve insertion hole 52. A bottomed pin insertion recess 57 coaxially communicating with the pin insertion hole 56 is provided on an inner surface of the valve insertion portion 51 facing the valve insertion hole 52.

The solenoid 10 has a substantially cylindrical shape and includes an electromagnetic portion 11 and a valve portion 12 projecting from the electromagnetic portion 11. As shown in FIG. 3, when the solenoid 10 is incorporated into the valve body 50, the valve portion 12 is fitted and inserted into the valve insertion hole 52 of the valve insertion portion 51 and a lower end part of the electromagnetic portion 11 is fitted and supported in the supporting groove 54. Note that a hydraulic circuit is configured between the valve insertion portion 51 and the valve portion 12.

A solenoid-side connector 80 to be electrically connected to the electromagnetic portion 11 is provided to project on the upper end of the electromagnetic portion 11. As shown in FIGS. 2 and 4, the solenoid-side connector 80 is connected to a cover-side connector 30 provided on the cover 60 as the valve portion 12 is properly inserted into the valve insertion hole 52.

As shown in FIG. 1, a pin insertion groove 13 penetrating in the vertical direction and open on a radial end part is provided at a position of the outer peripheral surface of the valve portion 12 near the electromagnetic portion 11. The pin insertion groove 13 is arranged to coaxially communicate with the pin insertion hole 56 with the valve portion 12 properly inserted in the valve insertion hole 52.

The pin 40 is a round bar extending long and narrow in the vertical direction. A diameter of the pin 40 is equal to or slightly larger than that of the pin insertion hole 56 and equal to or slightly larger than a groove width of a vertical central part of the pin insertion groove 13 (maximum groove width of the pin insertion groove 13). Further, a length of the pin 40 is sufficiently larger than a diameter of the valve portion 12 of the solenoid 10.

As shown in FIGS. 1 and 2, the cover 60 is a plate extending in a width direction across the valve insertion portions 51 while being arranged above the valve body 50. The cover 60 is provided with a plurality of connector mounting portions 62 (only one is shown in FIGS. 1 and 2) spaced apart in the width direction. The cover-side connector 30 is mounted into the connector mounting portion 62. The cover 60 is also provided with wire arrangement grooves 63 in which a plurality of unillustrated wires pulled out from the cover-side connectors 30 can be accommodated and arranged. Each wire arranged in the wire arrangement groove 63 is drawn out in the width direction along the cover 60.

Further, a plurality of resilient pressing pieces 61 (only one is shown in each figure) are integrally provided to the cover 60. As shown in FIGS. 1 and 2, the resilient pressing piece 61 is provided at a position adjacent to the connector mounting portion 62 and corresponding to each valve insertion portion 51 with the cover 60 arranged above the valve body 50.

As shown in FIGS. 3 and 4, the resilient pressing piece 61 is in the form of a plate piece and composed of a resilient main body 65 arranged to face the front surface of a facing plate 64 provided on the cover 60 and extending in the vertical direction, and a pressing piece portion 67 projecting forward from an upper end part of the resilient main body 65. The resilient main body 65 and the facing plate 64 are integrally coupled via a coupling piece portion 66 extending short in the front-back direction. The resilient main body 65 is arranged along the vertical direction with plate surfaces facing in the front-back direction. The pressing piece portion 67 is in the form of a claw, an inclined guiding surface 68 inclined downwardly toward the front is provided on the upper surface and a pressing surface 69 horizontally arranged along the front-back direction is provided on the lower surface.

Next, how to fix the solenoid 10 to the valve body 50 is specifically described.

In assembling, the cover 60 is arranged above the valve body 50. Then, the resilient main body 65 of the resilient pressing piece 61 is arranged substantially in an upright state immediately above an opening edge part of the pin insertion hole 56 of the pin insertion portion 55 (see FIG. 1). Further, the pressing piece portion 67 is arranged to face the pin insertion hole 56 from above.

Subsequently, the solenoid 10 is arranged to squarely face the valve insertion portion 51 from front and, in that state, the valve portion 12 of the solenoid 10 is inserted into the valve insertion hole 52 of the valve insertion portion 51 (see FIGS. 1 and 2). When the valve portion 12 is inserted to a proper depth into the valve insertion hole 52, the solenoid-side connector 80 is likewise connected to a proper depth into the cover-side connector 30 mounted in the connector mounting portion 62 of the cover 60.

Subsequently, the pin 40 is inserted into the pin insertion hole 56 of the pin insertion portion 55 from above. In the process of inserting the pin 40, a lower end part of the pin 40 slides on the guiding surface 68 of the pressing piece portion 67 and the resilient main body 65 is resiliently deformed outwardly with a coupled part to the coupling piece portion 66 as a supporting point. When the pin 40 is properly inserted into the pin insertion hole 56, the resilient main body 65 resiliently returns and is arranged substantially in an upright state along a length direction of the pin 40, and the pressing piece portion 67 is arranged to cover the upper end of the pin 40. Specifically, as shown in FIG. 3, the pressing surface 69 of the pressing piece portion 67 is arranged to be able to come substantially into surface contact with the upper end surface of the pin 40. Thus, even if an attempt is made to pull the pin 40 out of the pin insertion hole 56, the upper end surface of the pin 40 comes into contact with the pressing surface 69 of the pressing piece portion 67, thereby preventing the pin 40 from being inadvertently pulled out.

Further, with the solenoid 10 inserted to the proper depth in the valve insertion hole 52 of the valve insertion portion 51 and the pin 40 properly inserted in the pin insertion hole 56, the pin 40 coaxially penetrates through the pin insertion hole 56, the pin insertion groove 13 and the pin insertion recess 57 as shown in FIG. 3. In this way, the pin 40 is inserted and pierced through the valve insertion portion 51 and the solenoid 10 in a direction substantially perpendicular to an inserting direction of the solenoid 10 into the valve insertion portion 51. Thus, the solenoid 10 is prevented from coming out of the valve insertion hole 52 of the valve insertion portion 51. In the above way, the pin 40 is retained in the pin insertion portion 55, the solenoid 10 is retained in the valve insertion portion 51 and the solenoid 10 is positioned and fixed to the valve body 50.

On the other hand, if the solenoid 10 is left at an incompletely inserted position without being inserted to the proper depth into the valve insertion hole 52 of the valve insertion portion 51, the pin insertion groove 13 and the pin insertion hole 56 are deviated from each other without communicating, thereby restricting the insertion of the pin 40. Specifically, the tip (lower end) of the pin 40 comes into contact with the outer peripheral surface of the valve portion 12 of the solenoid 10 to restrict any further insertion of the pin 40. Thus, an upper end part of the pin 40 largely projects upward from the pin insertion hole 56, the pressing piece portion 67 is pressed by the pin 40 and the resilient main body 65 is left resiliently deformed. Accordingly, by visually confirming the resiliently deformed state of the resilient pressing piece 61 in addition to an upward (outward) projecting amount of the pin insertion hole 56 of the pin 40 exceeding a normal value (projecting amount in a state where the pin 40 is properly inserted in the pin insertion hole 56), it can be known that the pin 40 is not inserted to the proper depth and, consequently, it can be known that the solenoid 10 is not properly inserted in the valve insertion portion 51.

As described above, according to this embodiment, a specific member is not necessary other than the pin 40 as a fixing means in fixing the solenoid 10 to the valve body 50. Thus, the number of components can be drastically reduced than before.

Further, in removing the solenoid 10 from the valve body 50, the resilient pressing piece 61 is resiliently deformed to release the state of the resilient pressing piece 61 pressing the pin 40 and, in that state, the pin 40 is pulled out of the pin insertion hole 56, whereby the solenoid 10 can be taken out of the valve insertion portion 51. Thus, the entire cover 60 needs not be removed and the solenoid 10 can be easily removed.

Further, if the solenoid 10 is not properly inserted in the valve insertion portion 51, the insertion of the pin 40 is restricted and the deflected state of the resilient pressing piece 61 is not cancelled. Thus, by confirming that state, it can be clearly known that the solenoid 10 is in the incompletely inserted state. That is, it can be known whether or not the solenoid 10 is properly fixed to the valve body 50.

Furthermore, the resilient main body 65 is arranged substantially in the upright state along the length direction of the pin 40 with the detachment of the pin 40 restricted by the resilient pressing piece 61. Thus, when an external force acts on the pin 40 in a pull-out direction (upward direction), the deflection of the resilient main body 65 is effectively suppressed against the external force and a situation where the pin 40 is inadvertently pulled out is avoided.

Furthermore, since the resilient pressing piece 61 is integrally provided to the cover 60 and the cover 60 is provided with the wire arrangement groove 63, the cover 60 is commonly used as a member for arranging the wires and a member for restricting the detachment of the pin 40 and the number of components can be further reduced.

The invention is not limited to the above described and illustrated embodiment. For example, the following modes are also included in the scope of the invention.

The pin insertion recess may be omitted from the valve body.

The pin may be inserted only up to an intermediate position of the valve insertion hole and the lower end thereof may stop at an intermediate position of the valve portion of the solenoid in the height direction.

The pin may be, for example, in the form of a plate piece without being limited to the cylindrical shape. Note that the pin insertion hole and the pin insertion groove have only to be shaped and dimensioned such that the pin is insertable thereinto.

The pin insertion hole has only to be provided in the valve insertion portion to penetrate in the direction intersecting with the valve insertion hole and needs not necessarily be provided in the pin insertion portion.

LIST OF REFERENCE SIGNS

10 . . . solenoid
12 . . . valve portion
13 . . . pin insertion groove
40 . . . pin
50 . . . valve body
51 . . . valve insertion portion
56 . . . pin insertion hole
60 . . . cover
61 . . . resilient pressing piece
63 . . . wire arrangement groove
65 . . . resilient main body
67 . . . pressing piece portion

The invention claimed is:

1. A solenoid fixing structure, comprising:
a valve body including a tubular valve insertion portion;
a solenoid inserted into the valve insertion portion;
a cover arranged to cover the valve body in a direction intersecting with an inserting direction of the solenoid into the valve insertion portion; and
a pin inserted and pierced through the valve insertion portion and the solenoid from a side where the cover is located with the solenoid inserted in the valve insertion portion, thereby restricting a detachment of the solenoid from the valve insertion portion;
the cover including a resilient pressing piece configured to be pressed against the pin and resiliently deformed in the process of inserting the pin and hold an inserted state of the pin by resiliently returning and pressing an end part of the pin when the insertion of the pin is completed.

2. The solenoid fixing structure of claim 1, wherein the resilient pressing piece includes a resilient main body arranged along a length direction of the pin in a resiliently return state when the insertion of the pin is completed.

3. The solenoid fixing structure of claim 2, wherein the cover includes a wire arrangement groove in which a wire is arranged.

4. The solenoid fixing structure of claim 3, wherein the valve insertion portion includes a pin insertion hole, the solenoid includes a pin insertion groove, the pin insertion hole and the pin insertion groove communicate to allow the insertion of the pin from the pin insertion hole to the pin insertion groove in a state where the solenoid is inserted to a proper depth in the valve insertion portion, whereas the pin insertion hole and the pin insertion groove are deviated without communicating to restrict the insertion of the pin from the pin insertion hole to the pin insertion groove in a state where the solenoid is not inserted to the proper depth in the valve insertion portion.

5. The solenoid fixing structure of claim 4, wherein an outward projecting amount of the pin from the pin insertion hole exceeds a normal value in the state where the solenoid is not inserted to the proper depth in the valve insertion portion.

6. The solenoid fixing structure of claim 2, wherein the cover includes a wire arrangement groove in which a wire is arranged.

7. The solenoid fixing structure of claim 6, wherein the valve insertion portion includes a pin insertion hole, the solenoid includes a pin insertion groove, the pin insertion hole and the pin insertion groove communicate to allow the insertion of the pin from the pin insertion hole to the pin insertion groove in a state where the solenoid is inserted to a proper depth in the valve insertion portion, whereas the pin insertion hole and the pin insertion groove are deviated without communicating to restrict the insertion of the pin from the pin insertion hole to the pin insertion groove in a state where the solenoid is not inserted to the proper depth in the valve insertion portion.

8. The solenoid fixing structure of claim 7, wherein an outward projecting amount of the pin from the pin insertion hole exceeds a normal value in the state where the solenoid is not inserted to the proper depth in the valve insertion portion.

9. The solenoid fixing structure of claim 1, wherein the valve insertion portion includes a pin insertion hole, the solenoid includes a pin insertion groove, the pin insertion hole and the pin insertion groove communicate to allow the insertion of the pin from the pin insertion hole to the pin insertion groove in a state where the solenoid is inserted to a proper depth in the valve insertion portion, whereas the pin insertion hole and the pin insertion groove are deviated without communicating to restrict the insertion of the pin from the pin insertion hole to the pin insertion groove in a state where the solenoid is not inserted to the proper depth in the valve insertion portion.

10. The solenoid fixing structure of claim 9, wherein an outward projecting amount of the pin from the pin insertion hole exceeds a normal value in the state where the solenoid is not inserted to the proper depth in the valve insertion portion.

* * * * *